United States Patent [19]
Rengle

[11] Patent Number: 5,541,735
[45] Date of Patent: Jul. 30, 1996

[54] METHOD AND MECHANISM FOR SELECTING COLORED ITEMS RELATED TO OPTICAL CAPABILITIES OF ANIMALS

[76] Inventor: Edward Rengle, 1720 Old Augusta Rd., Waldoboro, Me. 04572

[21] Appl. No.: 402,138

[22] Filed: Mar. 10, 1995

[51] Int. Cl.$^6$ .................................................. G01J 3/46
[52] U.S. Cl. ........................... 356/402; 356/416; 359/890
[58] Field of Search ........................... 356/402–411, 416, 356/419; 351/163, 165, 177; 359/723, 890; 250/226

[56] References Cited

U.S. PATENT DOCUMENTS

| | | | |
|---|---|---|---|
| 5,252,997 | 10/1993 | Christenbery | 351/49 |
| 5,381,193 | 1/1995 | Wedding | 351/163 |
| 5,409,760 | 4/1995 | Neitz et al. | 428/195 |

*Primary Examiner*—Vincent P. McGraw
*Assistant Examiner*—K. P. Hantis

[57] ABSTRACT

A monocle can be provided with a light filter that transmits light wavelengths related to an animal's optical capabilities. The light filter will transmit light in the wavelengths and spectral sensitivity of the animal's retina rod photoreceptors, and in the wavelengths and spectral sensitivity of the animals retina cone photoreceptors during a specified light condition. The light filter selectively blocks certain wavelength ranges, such that the person using the monocle can effectively view objects in the same way as the animal does. The invention can be used to select clothing colors and patterns for camouflage purposes, select colored objects to be used in animal training, etc. A camera equipped with the desired light filter can also be used to aid in the selection process.

8 Claims, 3 Drawing Sheets

METHOD AND MECHANISM FOR SELECTING COLORED ITEMS RELATED TO OPTICAL CAPABILITIES OF ANIMALS

BACKGROUND OF THE PRESENT INVENTION

& SUMMARY OF THE PRESENT INVENTION

This invention is related to a method and mechanism for selecting clothing, and other items, based on the capabilities of animals to optically distinguish between different colored objects. The invention finds special utility in the process of selecting patterns and colors for outdoor clothing worn by hunters, especially deer hunters. The invention can also be used for selecting colored objects to be used in animal training.

In the field of animal hunting, hunters often select camouflage clothing and equipment designed to optically blend into the specific natural vegetation and environment viewed by the animal being hunted, e.g., a deer, bear, elk, or coyote.

Unfortunately, animals have different wavelength vision ranges than humans, so that equipment selections made on the basis of human vision capabilities do not always achieve the desired camouflage effect.

Human vision generally covers the wavelength spectrum from about 400 nanometers to about 700 nanometers wavelength. The human eye contains photoreceptors in the retina of two general types, namely rod photoreceptors and cone photoreceptors. The cones are located primarily in the center of the retina, while the rods are located in a ring-like pattern around the cones. Each photoreceptor, i.e., rod or cone, responds to, or is spectrally sensitive to, incoming light of a particular wavelength to generate impulses that are eventually supplied to the person's brain as colors or images.

In the human eye the rod photoreceptors respond to wavelengths in the range from about 400 to about 650 nanometers with the peak spectral sensitivity being about 507 nanometers. The cone photoreceptors respond to wavelengths in the range from about 400 to about 700 nanometers with the peak spectral sensitivity being about 555 nanometers.

Rod type photoreceptors are primarily responsible for vision in dim light, while the cone type photoreceptors are primarily responsible for vision in bright light. The rod type photoreceptors are thus more sensitive to incoming light than the cone photoreceptors.

The nature of the image sensed by the person's brain is related to the character of the photoreceptors in the retina of the eye. The human eye response covers the entire wavelength spectrum from about 400 nanometers to about 700 nanometers, such that humans can see a range of colors covering the entire spectrum, from violet to red, with no apparent breaks or discontinuities.

As indicated above, the rod photoreceptors are more receptive to low light levels than the cone photoreceptors, so that the rod photoreceptors are the predominant light sensors in low light conditions. The rod photoreceptors act in the lower portion of the spectrum so as to detect shape and contrast. In humans, the cone photoreceptors respond to the bright light over the entire visible spectrum so as to detect color and fine detail under bright light conditions. The rod and cone photoreceptors function in complementary fashion to provide a colored image under bright light conditions, and to provide black-gray contrast images under low light conditions.

The optical capabilities of animals are somewhat restricted, or at least different, as compared to the optical capabilities of humans. For example, in the white-tailed deer eye the rod photoreceptors respond to wavelengths in the range from less than 400 to about 630 nanometers with the peak spectral sensitivity about 490 to about 505 nanometers. The cone photoreceptors respond to wavelengths in the range from less than 400 nanometers to about 650 nanometers with the peak spectral sensitivity about 530 to about 545 nanometers. The white-tailed deer thus has different perception of color than the color perception of humans.

Similar differences exist with respect to the color and image perceptions of other animals. For example, dogs have cones and rods in the eye retina that enables them to have fair vision, both in the day, and in the night; the night vision of mountain lions and wolves is superior to that of humans. For many wildlife animals, the color perception is different than that of humans. The differences are attributable to differences in the numbers and characteristics of the rod photoreceptors and cone photoreceptors.

The present invention relates to a method and mechanism, whereby the optical capabilities of wildlife animals can be taken into account when selecting camouflage clothing, used in animal hunting, animal observation (photography), or selecting objects for animal training.

The invention can be embodied in a monocle used by a person when selecting clothing or equipment to be used while viewing or hunting wildlife animals. The monocle is constructed to include a light filter passing light waves that are within the vision parameters of the animal during a specific light intensity.

When the specially designed monocle is used by a person during the process of comparing outdoor clothing against the background environment, the process becomes more informative, since the person is enabled to compare the clothing and background pattern and coloring from the animal's perspective; i.e., the clothing and background scenery are compared as the animal would view them, whereby contrasts and optical similarities are more correctly determined.

The invention can be used either to provide visual similarities or visual contrasts, e.g., to design camouflage clothing, to design clothing that would alert a specific animal to the person's presence, or to design recognizable objects to be used for animal training.

Different monocular mechanisms, responsive to different rod and cone photoreceptor wavelength ranges of different animals, can be utilized according to the invention. The invention was devised specifically as an aid for selecting camouflage clothing, animal friendly clothing for hiking, wildlife photography, animal training, deer hunters, as well as the hunting of other animals etc., although the invention can be used for other purposes, e.g., the design of clothing and items related to animal vision capabilities.

A BRIEF DESCRIPTION OF THE DRAWINGS

FIG. 1, is a perspective view, of a monocular mechanism that can be used in practice of the invention.

FIGS. 2, 3, 4, 5, and 6, are charts depicting the spectral sensitivities of the eyes of humans and the white-tailed deer. Charts of the type shown, in FIGS. 2 through 6, can be used to design the monocular mechanism, shown in FIG. 1.

DESCRIPTION OF THE PREFERRED EMBODIMENTS OF THE PRESENT INVENTION

As previously noted, the present invention relates to a device, or apparatus, and a method, for viewing and light sensing background environments, and other objects, as spectrally seen by specific animals, e.g., deer, bear, elk, coyote, dogs, etc.

The ability to see the environment as specific animals see it is very advantageous to hunters, wildlife observers, wildlife photographers, animal trainers, etc. The optical device of the present invention enables individuals to select camouflage clothing and equipment that blend into the specific natural environment, as seen by the animal itself. The invention also facilitates the informed selection of dyes and pigments to choose or color objects used in animal training, whereby the object can be made recognizable.

The invention can be practiced in the form of a monocle, also referred to herein as a monocular mechanism, designed to pass light having only the wavelengths and intensities corresponding to the optical capabilities of particular animals, e.g. deer, bear, elk, dogs, etc. A light filter is incorporated into a monocle to block light wavelengths that are not discernible by the animal of special interest. This invention being portable, enables it to be used in various environments, including animals natural habitats, etc.

The invention, can be practiced with devices other than a monocle, e.g., a goggle, a photographic camera, a video camera, or other photosensitive devices, for measuring spectral reflectence, or intensity of spectral reflectence. The monocle, camera, or photometer, etc., is modified to include a light filter designed to pass certain light wavelengths, while excluding (blocking) other light wavelengths.

FIGS. 2, 3, 4, 5, and 6, are charts depicting the spectral sensitivities of the eyes of humans and the white-tailed deer. Charts of the type shown, in FIGS. 2 through 6, can be used to design the monocle, shown in FIG. 1.

Figure 2:
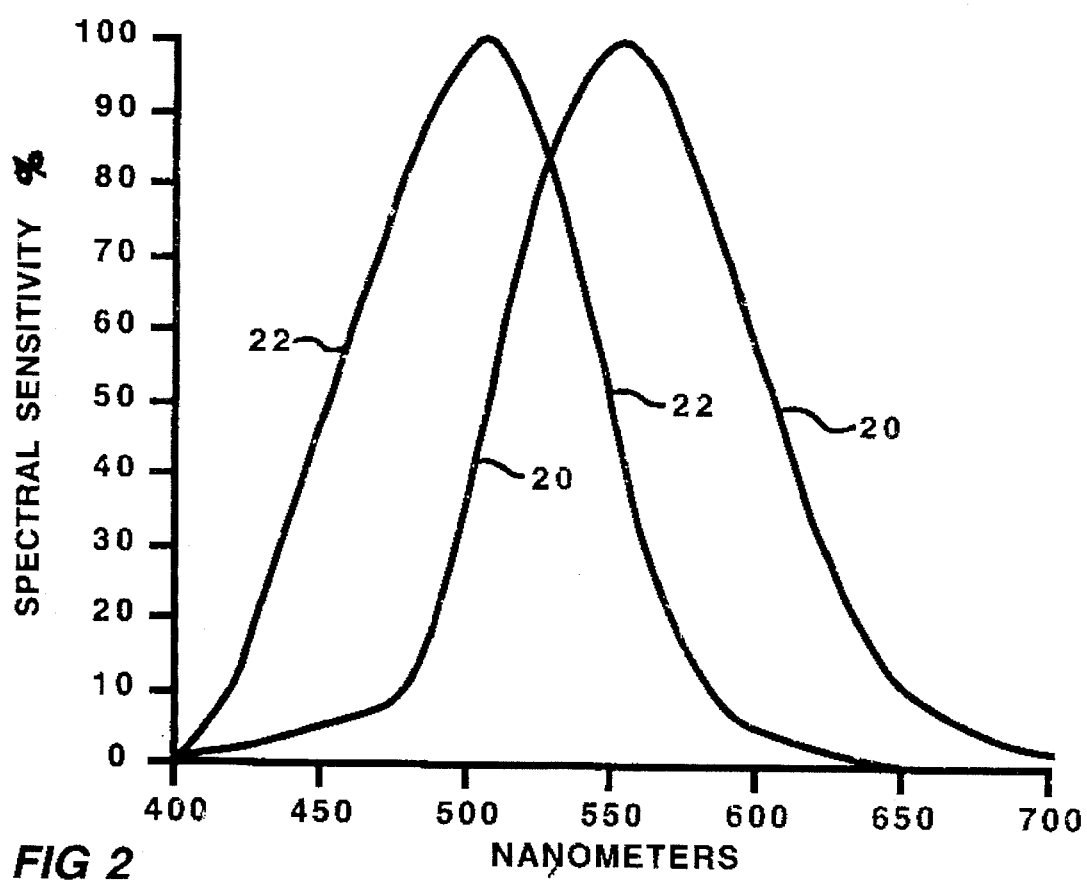

FIG. 2 of the drawings is a graph showing the spectral sensitivity of the human eye plotted as a function of the visible spectrum, i.e., a wavelength, of from about 400 nanometers to about 700 nanometers. The 400 nanometer wavelength represents the violet (purple) end of the spectrum, whereas the 700 nanometer wavelength represents the red end of the spectrum.

FIG. 2, includes a first curve 20 representing the spectral sensitivity of the cone photoreceptors, and a second curve 22 representing the spectral sensitivity of the rod photoreceptors. The rod photoreceptors have a peak spectral sensitivity at about 507 nanometers. The cone photoreceptors have a peak spectral sensitivity at about 555 nanometers. The curves shown in FIG. 2 represent values adopted by the Commission Internationale de L'Eclairage. The curves were developed from observation and elecroretinagram flicker photometry.

Figure 3:
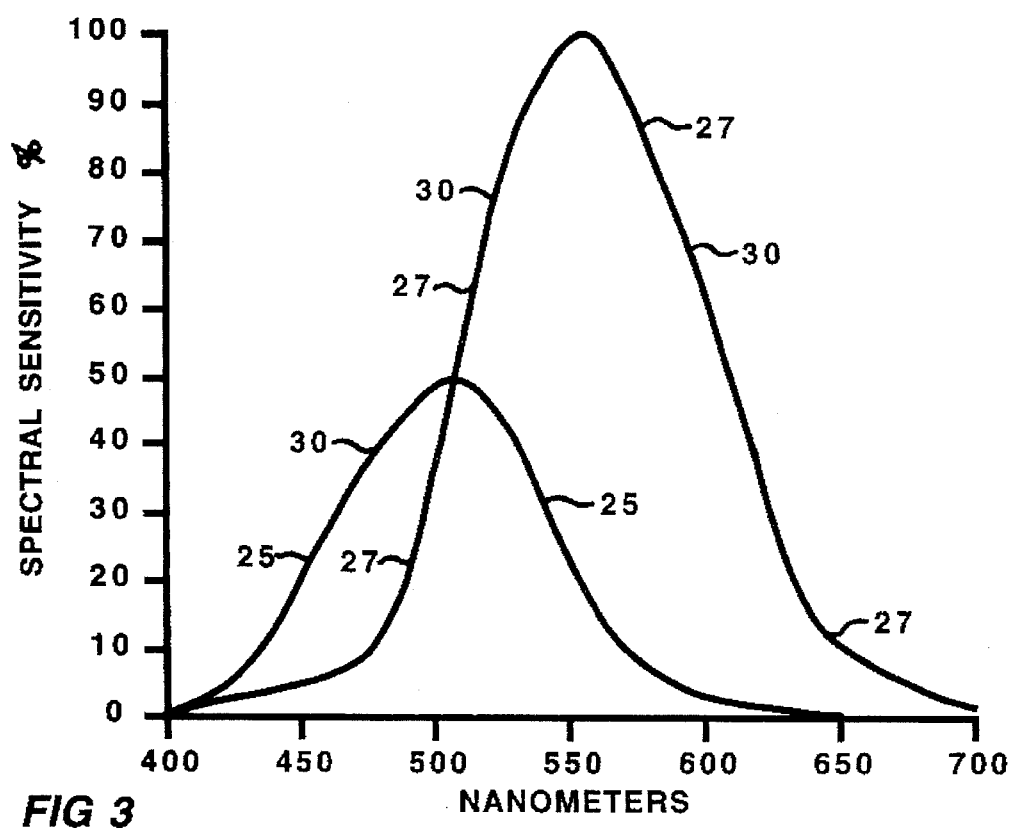

FIG. 3 of the drawings is a graph of the spectral sensitivity of a human eye plotted as a function of the visible wavelengths of light during dim light (approximately 50% light or shade/overcast) intensity. FIG. 3, includes a first curve 27 representing the spectral sensitivity of the cone photoreceptors, a second curve 25 representing the spectral sensitivity of the rod photoreceptors, and a third curve 30 representing the parameters of human vision during this light intensity. The following data is used to determine the predominance of either rod or cone vision:

Location of rods and cones: The central (fovea) area of the human eye consists entirely of cones. The peripheral (retina) area consists of both rods and cones with the cones in greater abundance toward the center.

Abundance of rods and cones: The area of the human eye receptive to light is physically dominated by cones.

Neurological independence of rods and cones: At very bright (light adapted) levels of daylight only the cones are functional. At very low (dark adapted) levels of light only the rods are functional. Rods and cones function in a complementary manner.

Since we are graphing average dim light (approximately 50% light or shade/overcast) intensity, human cones are dominant due to their location, abundance, and ability to function at a reasonable level in this light intensity. This relegates the rod function to the approximate level shown. Notice should be taken that the peak level of the sensitivity of the rod is lower than that of the cone, however the curve of the graph follows the same data as that of FIG. 2 of the drawings with this new peak as one hundred percent (100%) of it sensitivity.

Figure 4:
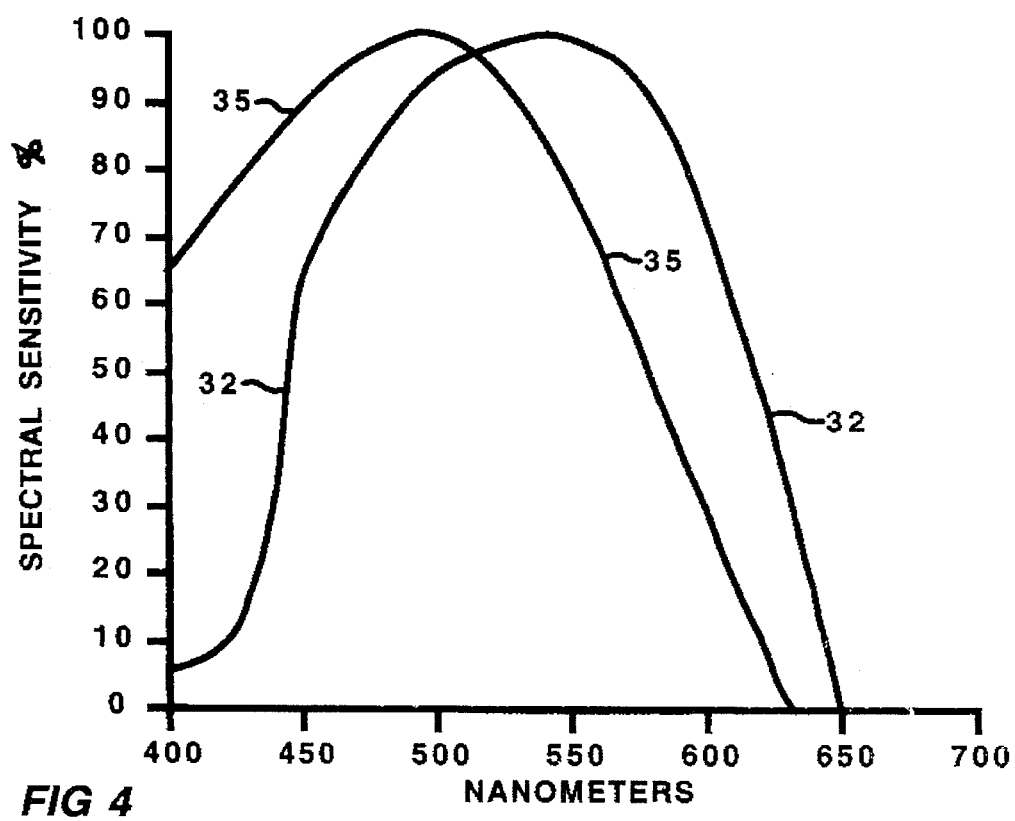

FIG. 4 of the drawings is a graph of the spectral sensitivity of the white-tailed deer plotted as a function of the visible wavelengths of light. FIG. 4, includes a first curve 32 representing the spectral sensitivity of the cone photoreceptors and a second curve 35 representing the spectral sensitivity of the rod photoreceptors. The rod photoreceptors have a peak spectral sensitivity at about 490 to about 505 nanometers. The cone photoreceptors have a peak spectral sensitivity at about 530 to about 545 nanometers. These curves were developed from observations and electroretinagram flicker photometry.

Figure 5:
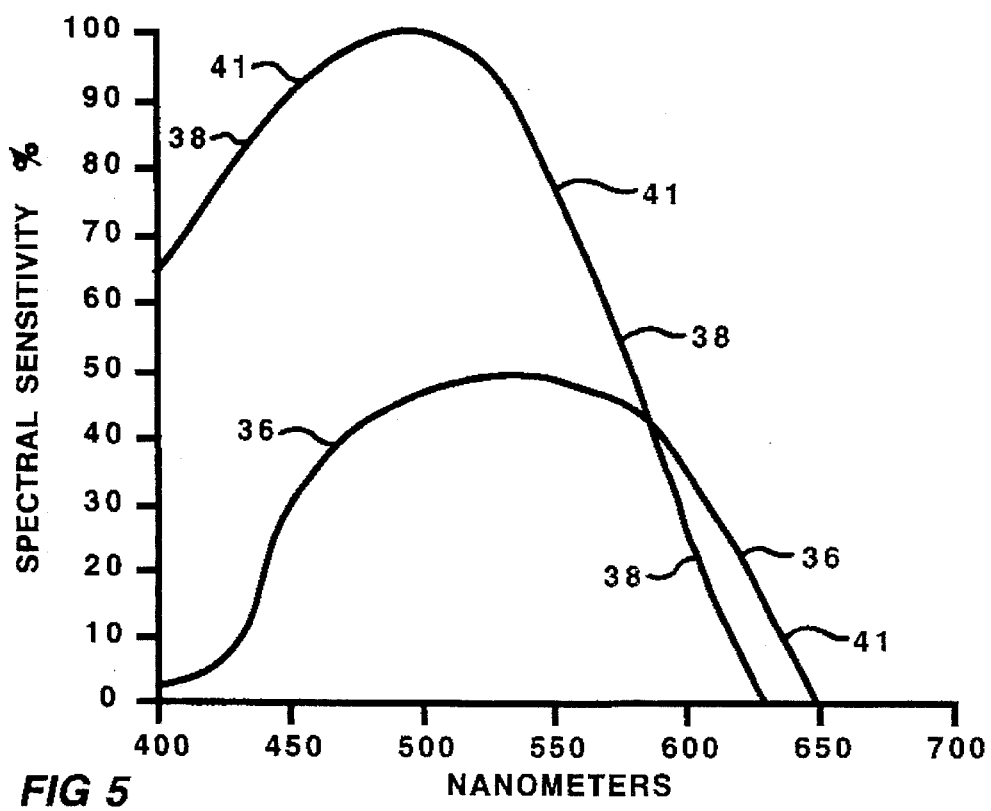

FIG. 5 of the drawings is a graph of the spectral sensitivity of a white-tailed deer eye plotted as a function of the visible wavelengths of light during dim light (approximately 50% light or shade/overcast) intensity. FIG. 5 includes a first curve 36 representing the spectral sensitivity of the cone photoreceptors, a second curve 38 representing the spectral sensitivity of the rod photoreceptors, and a third curve 41 representing the parameters of white-tailed deer vision during this light intensity. The following data is used to determine the predominance of either rod or cone vision:

Location of rods and cones: The central (fovea) area of the white-tailed deer eye consists predominantly of rods. The peripheral (retina) area consists of all rods.

Abundance of rods and cones: the area of the white-tailed deer eye receptive to light is physically dominated by rods.

Neurological independence of rods and cones: At very bright (light adapted) levels of daylight only the cones are functional. At very low (dark adapted) levels of light only the rods are functional. Rods and cones function in a complementary manner.

Since we are graphing average dim light (approximately 50% light or shade/overcast) intensity, the white-tailed deer rods are dominant due to their location, abundance, and ability to function at a reasonable level in this light intensity. This relegates the cone function to the approximate level shown. Notice should be taken that the peak level of the sensitivity of the cone is lower than that of the rod, however the curve of the graph follows the same data as that of FIG. 4 of the drawings with this new cone peak as one hundred percent (100%) of its sensitivity.

Figure 6:
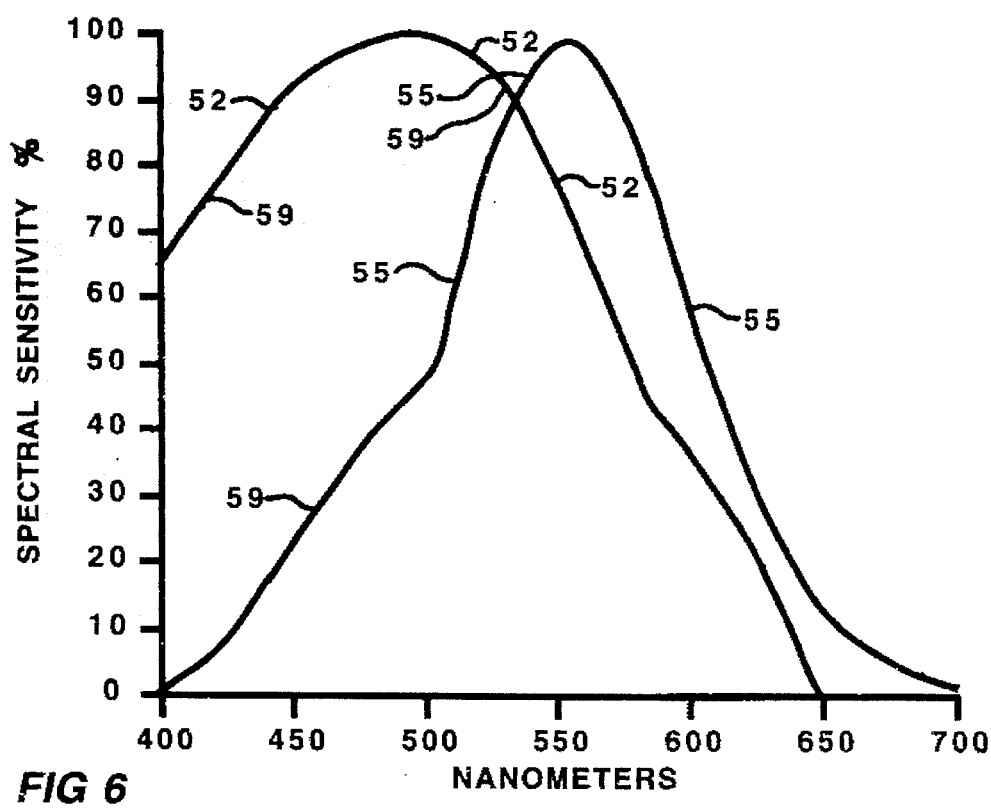

FIG. 6 of the drawings is a graph of the white-tailed deer parameter of vision during dim light (approximately 50% light or shade/overcast) intensity and a human's parameter of vision during dim light (approximately 50% light or shade/overcast) intensity. These curves are taken from FIGS. 5 and 3 respectively.

FIG. 6 includes a first curve 52 representing the parameters of the white-tailed deer vision during dim light (approximately 50% light or shade/overcast) intensity a second curve 55 representing the parameters of vision of a human eye during dim light (approximately 50% light or shade/overcast) intensity, and third an area within lines 59 representing the sensitivity of the white-tailed deer vision not shared by human vision. Curves 52 and 55 represent spectral sensitivity plotted as a function of the visible wavelengths of light.

The design curve of the optical wavelength pass filter for the white-tailed deer during dim light (approximately 50% light or shade/overcast) intensity is the same as FIG. 5 curve 41, and FIG. 6 curve 52, representing the white-tailed deer parameter of vision during this intensity. The focus of attention for the design of the wavelength pass filter is the wavelengths of extreme peak sensitivity and the wavelength of extreme lack of sensitivity.

The abscissa of the FIG. 6 graph is labeled as nanometers and is representative of the visual spectrum of light. It is also representative of the quality of light or in common terms color. The colors of the spectrum are generally agreed to be represented by the following nanometers (nm) of wavelength: 400 to 450 nm violet, 450 to 480 nm blue, 480 to 510 nm blue green, 510 to 550 nm green, 550 to 570 nm yellow green, 570 to 590 nm yellow, 590 to 630 nm orange, and 630 to 700 nm red.

It is apparent in FIG. 6 that the white-tailed deer lacks visual sensitivity to most of the color red. The method of viewing through this monocular mechanism constructed with a light filter representative of FIG. 6 curve 52 limits our vision to see only the colors that are sensitive to the vision of the white-tailed deer.

It is also apparent in FIG. 6 that there is an area within lines 59 representing the sensitivity of the white-tailed deer vision not shared by human vision. There is a general agreement within the scientific community that sensitivity to the wavelengths of light aids in the ability of the animal to distinguish between colored objects. The method of using this monocular mechanism constructed with a light filter representative of FIG. 6 curve 52 in conjunction with a photometer enables us to measure the visual sensitivity of a white-tailed deer.

The method of viewing through the monocular mechanism limits our vision to see the colors on the abscissa, and the method of using this monocular mechanism in conjunction with a photometer allows us to measure the visual sensitivity on the ordinate. This enables us to realize all cartesian coordinate points only within the parameters of the light filter. Therefore, this monocular mechanism fulfills its intended purpose by enabling a human to select clothing and other items based on the capability of animals to optically distinguish between different colored objects. In this case the selection of clothing and other items based on the optical capability of the white-tailed deer during dim light conditions.

The application of this filter device in more practical terms warrants discussion. The white-tailed deer is both nocturnal and diurnal, and prefers to spend most of its time in a shade, overcast, dusk, or dawn environment while awake. A white-tailed deer hunter can take his camouflage clothes and items into the area he intends to hunt in and view through this filter monocle designed for white-tailed deer at dim light intensity to get a good general idea of how the color of his clothes blend into the surrounding environment. If he wants to be more particular about his choice of clothing and items, he can hold the eyeguard of the filter monocle over the aperture of a common 35 mm SLR camera, in such a way as to exclude extraneous light, view through the view finder to see the colors, and watch the needle on the camera's light meter to measure the sensitivity difference between his clothes and the surrounding environment. The filter device can be viewed through and used in conjunction with a more sensitive photometer to design and manufacture clothing and other items to meet specific needs relating to animal vision capabilities.

The invention is practiced differently according to the particular animal's vision that is to be duplicated. A light filter is selected to correspond according to the spectral sensitivity of rod photoreceptors and cone photoreceptors, during a specified light condition, with the area of peak spectral sensitivity, and the area of lack of sensitivity given the primary focus of attention. For example, the peak spectral sensitivity and lack of sensitivity of the particular animal, e.g., deer, bear, mountain lion, dog, etc.

Figure 1:
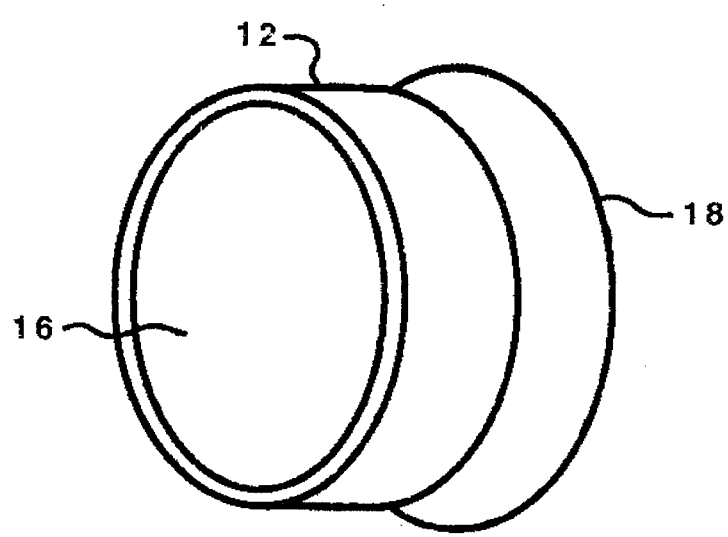

FIG. 1, is a perspective view of a monocle that can be used in the practice of the invention.

FIG. 1, shows a monocle that includes a frame 12. A light filter 16 is mounted within the frame 12, whereby, when the frame 12 is positioned on a person's facial periphery of the eye socket, the light filter 16 is aligned with the person's eye.

Frame 12, has a flexible (deformable) peripheral edge area 18, that is turned rearwardly so as to engage the person's facial periphery of the eye socket, such that the light filter 16 is spaced a suitable distance forwardly from the person's eye. Flexible edge area 18 of the frame is intended to fit closely against the person's facial periphery of the eye socket so as to exclude ambient, non-filtered, light from entering the area behind light filter 16 (except by passage through the light filter).

Frame 12, can be of a molded elastomeric construction designed to have an optical sealed engagement with the person's face, in the manner of the goggles shown in U.S Pat. No. 5,157,426, to J. Kronberg. The function of frame 12 is to position the filter in front of the person's eye, while preventing light from by-passing the filter system.

FIG. 1, shows a monocle that includes a frame 12. A light filter 16 is mounted within the frame 12, whereby, when the frame 12 is positioned over the aperture of a photometer, the light filter 16 is aligned with the aperture of the photometer.

Frame 12 has a flexible (deformable) peripheral edge area 18, that is turned rearwardly so as to engage the aperture body of a photometer so as to exclude ambient, non-filtered light from entering the area behind light filter 16 (except by passage through the light filter).

In the present invention, the design includes a light filter, designed to pass light in the wavelength ranges, related to the peak spectral sensitivity and lack of spectral sensitivity of both the rod photoreceptors and cone photoreceptors, in the retina of a specific animal during a specified light condition e.g., a white-tailed deer, etc.

The retina of a white-tailed deer's eye comprises rod type photoreceptors that are spectrally sensitive to light waves in the wavelength range from less than 400 to about 630 nanometers; peak spectral sensitivity is about 490 to about 505 nanometers. The retina of the deer's eye further comprises cone type photoreceptors that are spectrally sensitive to light in the wavelength range from less than 400 to about 650 nanometers; peak spectral sensitivity is at about 530 to about 545 nanometers.

With the described light filter, the light reaching the person's eyes will correspond to the spectral sensitivity of the deer eye during a specified light condition.

The light filter apparatus can be used to select clothing, and other materials, to either blend with the background environment, or contrast with the background environment, depending on the type of contemplated activity. When viewing and light sensing the materials against the background environment, the process is carried out in a desired light condition.

The invention is believed to be applicable for selecting colors and patterns related to the optical capabilities of various animals, e.g., deer, dogs, bear, mountain lions, elk and other wildlife. The invention can be used in connection with various types of activities, e.g., hunting, wildlife photography, animal studies, animal training, etc.

The present invention described above, relates to a Method and mechanism for selecting colored items related to optical capabilities of animals. Features of the present invention are recited in the appended claims. The drawings contained herein necessarily depict structural features and embodiments of the Method and mechanism for selecting colored items related to optical capabilities of animals, useful in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed:

1. A method of selecting colors and patterns relating to a nonhuman's ability to optically distinguish the colors and patterns from the background environment, said method comprising:

viewing and light intensity measurement of items against a representative background environment, using a light filter that passes light waves simulating both the spectral sensitivity of a nonhuman's eye rod photoreceptors and the spectral sensitivity of a nonhuman's eye cone photoreceptors during a specified light condition.

2. The method, as described in claim 1, wherein the viewing and light intensity measurement step is carried out with a light filter that comprises a monocle eyeguard; and said monocle being constructed so that the light filter passes light waves simulating both the spectral sensitivity of the nonhuman's eye rod photoreceptors and the spectral sensitivity of the nonhuman's eye cone photoreceptors during a specified light condition.

3. The method, as described in claim 2, wherein the viewing and light intensity measurement step is carried out with a monocle eyeguard constructed to exclude from the user's eyes or user's light intensity measuring equipment any light other than the light waves passed by said light filter.

4. A method of selecting colors and patterns relating to a white-tailed deer's ability to optically distinguish the colors and patterns from the background environment, said method comprising:

viewing and light intensity measurement of items against a representative background environment using a light filter that passes light waves in the range from less than 400 to about 650 nanometers with the peak range about 490 to about 505 nanometers during dim light conditions.

5. The method, as described in claim 4 wherein the viewing and light intensity measurement step is carried out with a light filter that comprises a monocle eyeguard.

6. The method, as described in claim 5, wherein the viewing and light intensity measurement step is carried out with a monocle constructed to exclude from the user's eyes or user's light intensity measuring equipment any light other than the light waves passed by the said light filter.

7. A monocular mechanism for viewing and light intensity measuring items and patterns, relating to a nonhuman's ability to optically distinguish the items and patterns from the background environment;

said monocular mechanism comprising a light filter; and the light filter passes light waves simulating both the spectral sensitivity of the nonhuman's eye rod photoreceptors and the spectral sensitivity of the nonhuman's eye cone photoreceptors during a specified light condition.

8. The monocular mechanism, as described in claim 7, wherein said light filter passes light waves in the range from less than 400 to about 650 nanometers with the peak range about 490 to about 505 nanometers, whereby the monocular mechanism is designed to duplicate the optical capability of a white-tailed deer during dim light conditions.

* * * * *